Figure 1:
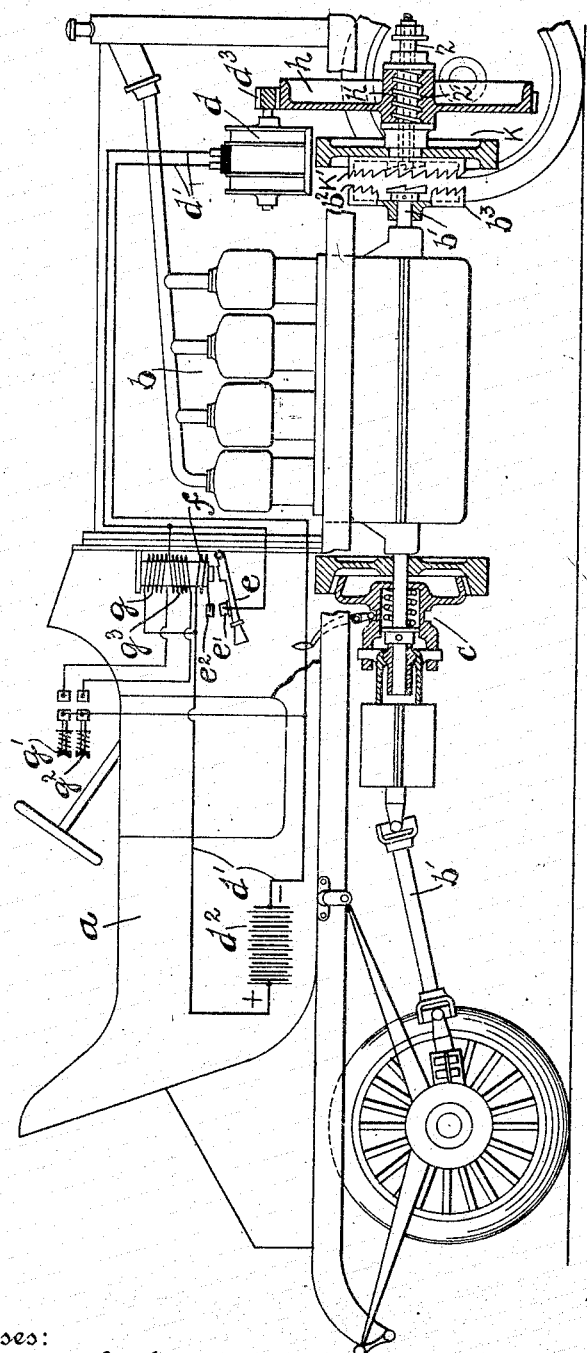

W. D. LUTZ.
STARTING DEVICE FOR INTERNAL COMBUSTION ENGINES.
APPLICATION FILED OCT. 8, 1913.

1,136,688.

Patented Apr. 20, 1915.
2 SHEETS—SHEET 1.

Witnesses:
Ernest L. Gale, Jr.
Arthur Tregire Jr.

W. D. Lutz
Inventor

By his Attorney
L H Campbell

W. D. LUTZ.
STARTING DEVICE FOR INTERNAL COMBUSTION ENGINES.
APPLICATION FILED OCT. 8, 1913.
1,136,688.
Patented Apr. 20, 1915.
2 SHEETS—SHEET 2.
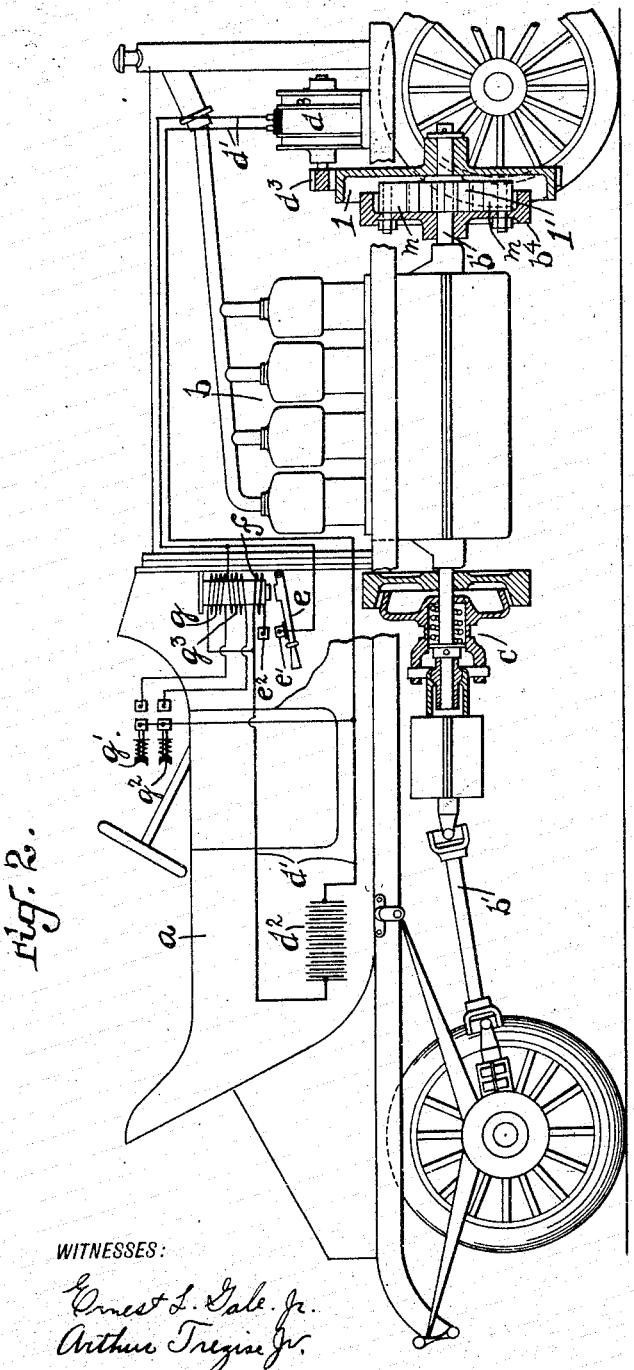
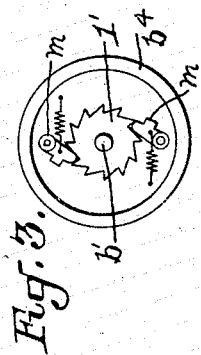
WITNESSES:
Ernest L. Gale Jr.
Arthur Tregise Jr.
W. D. Lutz
INVENTOR
BY
L. H. Campbell
ATTORNEY

UNITED STATES PATENT OFFICE.

WILLIAM D. LUTZ, OF ALLENDALE BOROUGH, NEW JERSEY.

STARTING DEVICE FOR INTERNAL-COMBUSTION ENGINES.

1,136,688.  Specification of Letters Patent.  Patented Apr. 20, 1915.

Application filed October 8, 1913. Serial No. 794,181.

*To all whom it may concern:*

Be it known that I, WILLIAM D. LUTZ, a citizen of the United States, residing in the borough of Allendale, in the county of Essex and State of New Jersey, have invented a new and useful Improvement in Starting Devices for Internal-Combustion Motors, of which the following is a specification.

This invention relates to a starting device for internal combustion motors and is designed with especial reference to its application to such motors when used for the propulsion of vehicles.

More particularly the invention is concerned with starting devices in which the motive power is derived from an auxiliary motor operated by electricity, air, springs, etc., an electric motor being illustrated herein for the purposes of this disclosure.

The principal object is to provide in combination with a starting motor and its control system, clutch elements connected operatively to the starting motor and to the crank shaft of the internal combustion engine to which the starting motor is applied, respectively, and adapted to engage each other upon the operation of the starting motor to rotate the crank shaft and to disengage from each other automatically upon rotation of the crank shaft under the power of the internal combustion engine at a predetermined minimum speed.

A further object is to construct and arrange the clutch elements so that they shall engage to transmit the turning effort from the starting motor to the crank shaft only after the former has reached an appreciable speed.

Reference is now to be had to the accompanying drawings for a detailed description of the invention in which—

Figure 1 is a view partly in section and partly in outline showing the application of the invention to an automobile, the starting motor having its circuit shown diagrammatically; Fig. 2 is a view similar generally to Fig. 1, but showing a somewhat modified construction of clutch elements; Fig. 3 is a detail view in front elevation of the movable member of the clutch shown in Fig. 2.

While, as indicated hereinbefore, the invention is not limited in its application to motor cars, it is shown and described herein in connection with such vehicles, as it is in this field that it finds its greatest range of usefulness. Then, too, while the auxiliary starting motor shown in the present embodiment is electrically driven and its circuit described with some particularity, it is to be kept in mind that fluid, spring and other motors may be employed in a corresponding capacity without departing from the spirit of the invention.

The automobile body, indicated at $a$, may be driven by an internal combustion motor $b$ mounted as usual toward the forward end of the chassis and driving, through the crank shaft $b'$ and suitable clutch $c$, the rear wheels of the car. In such construction it is usual to extend the crank shaft $b'$ forwardly and connect thereto a suitable crank usually disposed in front of the radiator of the vehicle, whereby, through manual operation the crank shaft may be rotated to give the pistons the required initial movement, the purposes of which will be understood.

In accordance with the present invention it is proposed to render unnecessary the manual operation referred to above and to provide an efficient starting device which may be compactly mounted within the usual engine hood, and connected operatively through improved clutch members with the crank shaft of the internal combustion engine.

Referring now to both Figs. 1 and 2, in which the electric systems are similar, it will be seen that the electric starting motor $d$ is connected through the usual leads $d'$ to a battery $d^2$ or other available source of current. One of the leads $d'$ may have therein a movable switch $e$ carrying a terminal $e'$ adapted to coöperate with a suitable fixed terminal $e^2$ to complete the circuit. The switch $e$ is arranged to be moved to closed position under the action of a magnetic core $f'$ around which passes the lead $d'$ from the source of current supply, the current in this lead serving to hold the switch in closed position and thus constituting during the operation of the starting motor, a self holding switch. It is to be noted that the initial movement of the switch $e$ to closed position is brought about through the energizing of the core $f'$ by a secondary winding $g$, connected in parallel with the main supply leads $d'$ from the source of current $d^2$. The circuit of the secondary winding may be controlled through push buttons $g'$ and $g^2$, whereby the current may be started or stopped in its passage through the coil, as will appear from an inspection of the drawing. It is apparent that as soon as the current through the secondary leads $g$ has caused the core $f'$ to move the switch $e$ to closed position, the direct passage of current through the motor $d$ will then be sufficient to maintain the core in its energized condition and hold the switch $e$ closed. Accordingly if desired the passage of current through the secondary winding $g$ may then be stopped by operating the appropriate button $g^2$ which controls the circuit to a reverse coil $g^3$, on the controlling magnet.

The control system for the starting motor having been described, the mechanical elements entering into the structure of the improved device will be considered. Referring to Fig. 1, the motor $d$ carries on its armature a pinion $d^3$ in driving engagement with a gear $h$, the hub of which is threaded interiorly with quick thread, as $h'$, corresponding to threads $2'$ formed on a stub shaft 2, on which the gear $h$ is mounted. On one end of the shaft 2 is fixedly mounted a clutch member $k$, in the form shown, a fly wheel having ratchet teeth $k'$ disposed laterally on its free face and with which are adapted to coöperate similar ratchet teeth $b^2$ formed on the proximate face of a second clutch member $b^3$ carried by the crank shaft $b'$ of the internal combustion engine $b$.

From the aforegoing description it will appear that upon rotation of the gear $h$ as through the pinion $d^3$, the tendency of the shaft 2 with the clutch member $k$ is to maintain its normal position. The engagement of the threads $h'$ on the interior of the hub of the gear $h$ with the threads $2'$ on the shaft 2, however, causes the rotation of said shaft although its tendency is to "lag" behind the gear $h$. This tendency results in its axial movement until the teeth $k'$ of the clutch member $k$ engage the teeth $b^2$ of the second clutch member $b^3$. At this time further relative rotation or movement of the gear $h$ with respect to the clutch member $k$ is prevented by reason of the resistance to the rotation of the gear offered by the engine crank shaft $b'$ with which the gear is now operatively connected. Accordingly rotation of the gear $h$ results in rotation of the crank shaft $b'$ and movement of the pistons of the internal combustion engine $b$ until the latter is driven under its own power in the manner well known. Preferably the maximum speed of rotation of the clutch member $k$ when actuated by the starting motor $d$ is less than the minimum speed of rotation of the crank shaft $b'$ of the internal combustion engine $b$ when the latter is running under its own power. Accordingly, as soon as the internal combustion motor $b$ operates under its own power—its speed almost invariably being higher than that of the starting member—the teeth $b^2$ of the clutch member $b^3$ release from engagement the teeth $k'$ of the clutch member $k$ permitting this member $k$ to travel axially when the rotation of the gear $h$ is stopped in a manner conversely to that described upon the starting of these members.

In practice, it is desirable to have the holding strength of the core $f'$ so proportioned that when the current in the leads $d'$ drops to a point sufficient only to operate the motor $d$ under no load, the movable switch member $e$ will be released to break the motor circuit, and so it will be seen that when the internal combustion engine $b$ operates under its own power so as to relieve the motor $d$ of its load, the latter will subsequently be stopped automatically through the release of the switch $e$ resulting from the drop in current flow in the motor circuit. As soon as the rotation of the gear $h$ is thus stopped the clutch member $k$ will travel axially on its threads to its normal position out of engagement with the clutch member $b^3$ as indicated above.

The modified construction illustrated in Figs. 2 and 3 falls readily within the province of this invention, as will appear from a description of the clutch elements, the rest of the structure being similar to that shown in Fig. 1 and the several elements performing similar functions.

In Fig. 2 the same reference characters are used as in Fig. 1, except in so far as the corresponding parts are of altered construction. The gear $l$ in mesh with the driving pinion $d^3$ carries fixedly on one face a ratchet wheel $l'$ with the teeth of which coöperate pawls $m$ carried on the proximate face of a disk $b^4$ keyed to the crank shaft $b'$ of the engine $b$. Upon rotation of the gear $l$ by the driving pinion $d^3$ the pawls $m$ engage the teeth of the ratchet wheel $l'$ and the crank shaft $b'$ is rotated, as explained with reference to Fig. 1. When the engine $b$ operates under its own power, however, the higher speed of rotation of the disk $b^4$ and preferably the minimum speed, is sufficient to throw the pawls out of engagement with the teeth of the ratchet wheel $l'$, under centrifugal action. The load being thus automatically removed from the starting motor $d^3$, the current in its circuit will decrease and the switch $e$ will drop to break the circuit and stop the motor, as will be understood. It may happen, under some conditions of use that the ratchet wheel $l'$ will be rotating when the speed of rotation of the disk $b^4$ (driven under the engine power) is decreased appreciably and to a point below that of the rotating ratchet wheel. In such a case, were suitable provision not made, the pawls would drop suddenly into engagement with the rapidly revolving ratchet wheel $l$ and damage the apparatus. To meet this condition, the pawls $m$ have their engaging ends rounded so that they will not engage positively with the teeth of the ratchet wheel $l'$ until the relative difference in speed is comparatively negligible.

Of course, it is obvious that upon the speed of the motor becoming reduced to that rate where the power of the springs is greater than the centrifugal force, the pawls will be caused by the springs to engage the ratchet teeth, automatically restoring the engagement, thus in case the motor stalls or otherwise is temporarily stopped, the operator can readily start it again by the starting device.

Modifications and arrangements such as have been hereinbefore indicated, as well as numerous others, obvious to persons skilled in the art, may be made without departing from the spirit of the present invention, provided such changes shall fall within the scope of the appended claims.

What I claim, and desire to secure by Letters Patent of the United States is:—

1. In an electric apparatus for starting an internal combustion engine, an electric motor, means to connect automatically the same with the crank shaft of the engine, a source of current supply therefor, circuits between the motor and the source of supply, a switch in the circuit, an electromagnet for holding the switch in the position in which it is moved when operated, and means for breaking the circuit of said magnet releasing the switch held thereby.

2. An electric apparatus for starting an internal combustion engine, means to connect the same with the crank shaft of the engine, means to disconnect the same from the crank shaft of the engine, a source of current supply therefor, circuits between the motor and the source of supply, a switch in the circuit, an electromagnet for holding the switch in the position in which it is moved when operated, and means for breaking the circuit of said magnet releasing the switch held thereby.

3. An electric apparatus for starting an internal combustion engine, means to connect the same with the crank shaft of the engine, means to automatically disconnect the same from the crank shaft of the engine, a source of current supply therefor, circuits between the motor and the source of supply, a switch in the circuit, an electromagnet for holding the switch in the position in which it is moved when operated, and means for breaking the circuit of said magnet releasing the switch held thereby.

4. An electric apparatus for starting an internal combustion engine, means to connect automatically the same with the crank shaft of the engine, means to disconnect automatically the same from the crank shaft of the engine, a source of current supply therefor, circuits between the motor and the source of supply, a switch in the circuit, an electromagnet for holding the switch in the position in which it is moved when operated, and means for breaking the circuit of said magnet releasing the switch held thereby.

In testimony whereof, I have signed my name to this specification in the presence of two subscribing witnesses.

WILLIAM D. LUTZ.

Witnesses:
JAMES G. BETHELL,
ERNEST L. GALE, Jr.